W. G. ENTREKIN.
APPARATUS FOR EVAPORATING WASTE ALKALINE SOLUTIONS.

No. 185,307. Patented Dec. 12, 1876.

UNITED STATES PATENT OFFICE.

WILLIAM G. ENTREKIN, OF PHILADELPHIA, PENNSYLVANIA.

IMPROVEMENT IN APPARATUS FOR EVAPORATING WASTE ALKALINE SOLUTIONS.

Specification forming part of Letters Patent No. 185,307, dated December 12, 1876; application filed September 18, 1876.

*To all whom it may concern:*

Be it known that I, WILLIAM G. ENTREKIN, of Philadelphia, Pennsylvania, have invented a Mode of, and Apparatus for, Evaporating Waste Alkaline Solutions, of which the following is a specification:

The object of my invention is to rapidly and thoroughly evaporate waste alkaline solutions by causing them to flow down inclined planes onto the calcining-bed of an evaporating-furnace, in the manner described hereafter.

Figure 1:
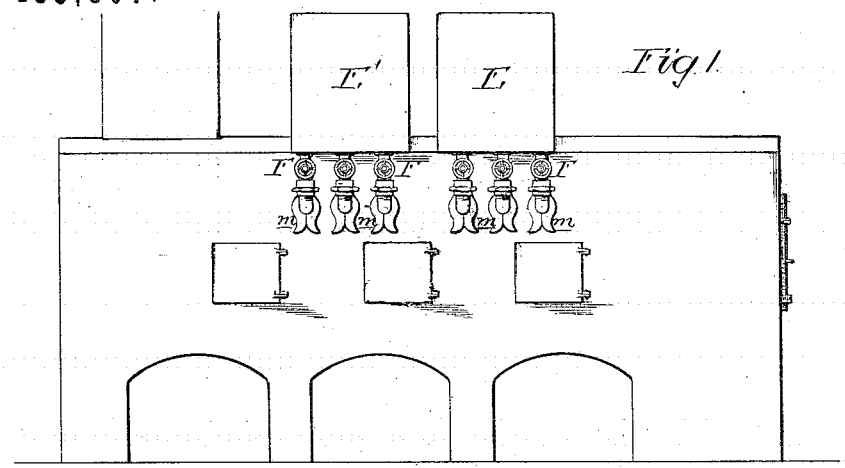
Figure 2:
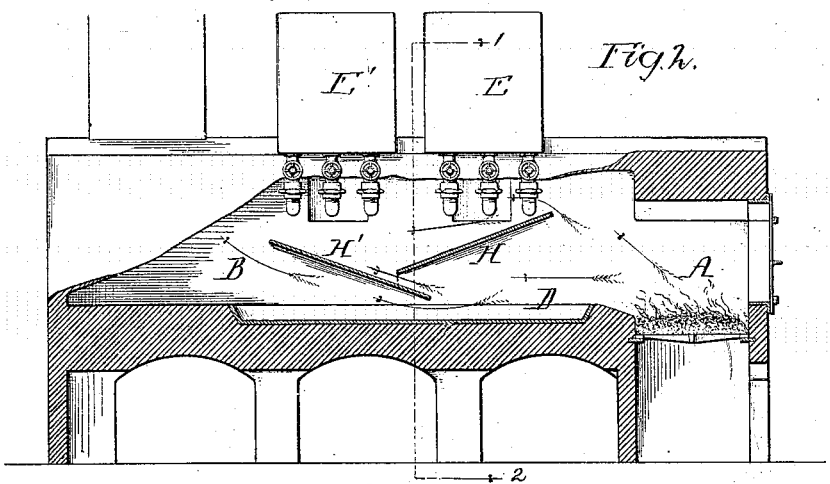
Figure 3:
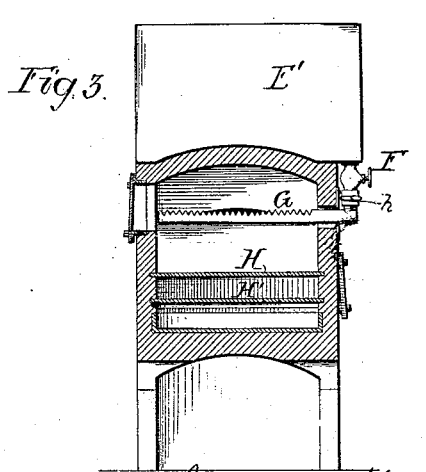

In the accompanying drawing, Figure 1 is an exterior view of the furnace for carrying my invention into effect; Fig. 2, a sectional view; Fig. 3, a transverse section on the line 1 2, Fig. 2; and Figs. 4 and 5, detached views of part of the apparatus used in conducting my process.

Figure 5:
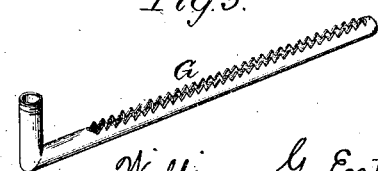

A is the fire-place of the furnace; B, the evaporating-chamber, through which the products of combustion pass to the chimney; and D, the calcining-bed. E E' are tanks, situated on the top of the furnace, and containing the alkaline solutions to be evaporated, part of each tank projecting over the side of the furnace, as shown in Fig. 3. On the bottom of this projecting portion of each tank are a number of faucets, F—three in the present instance—and to each faucet is coupled the vertical branch of a tube, G, the horizontal branch of which projects through the wall of the furnace and across the interior of the evaporating-chamber, the portion of the tube within the chamber being open at the top, and the edges of the elongated opening being notched, as shown in Fig. 5, for a purpose explained hereafter.

Two inclined plates, H H', extend across the evaporating-chamber of the furnace, one plate beneath each tank and its set of tubes G. I prefer to arrange the plates H H' in the relative positions shown in Fig. 2, for the purpose of deriving the greatest heating effect from the products of combustion.

It should here be understood that I propose to make the furnace much longer than is shown in the drawing, and to repeat, at appropriate intervals, the arrangement in pairs of tanks and inclined evaporating-plates.

The liquid is permitted to flow from the tanks in limited quantities into the tubes G, after filling which it will pass over the notched edges of the elongated openings in the said tubes onto the inclined plate below, and thence into the calcining-bed D.

My aim has been to cause the liquid to flow down the inclined plate in a uniform stream, extending over the entire plate, the stream being as thin as possible, so as to insure a rapid evaporating effect.

The sole object of the notches on the edges of the openings in the tubes is to insure this desired equal distribution of the liquid over the plates, for in the absence of the notches, which are in fact equivalent to rows of small spouts, a slight departure of the tube from a horizontal position would cause a want of uniformity in the distribution of the liquid onto the said plates.

My preference for tubes with elongated openings to simple perforated tubes is due to the peculiar character of solutions which have to be treated.

In pulping wood with caustic alkali much woody fiber is necessarily contained in the waste solutions, and this fiber would soon choke small perforations in the tubes, and the latter would require the repeated cleansing. Even the tubes with elongated openings must be cleansed from time to time; hence I provide for their ready removal and replacing by couplings $h$, attached to the cocks F, each coupling consisting of a thimble with right and left handed internal threads, so that each tube G may be readily disconnected from its faucet by the manipulation of the thimble. Other well-known coupling devices may be employed.

Figure 4:

I hinge to the wall of the furnace, at each opening in the same for the admission of each tube, plate $m\ m$, Fig. 4, adapted to the tube, so that when the latter is in place the opening may be closed and air excluded, the plates being separated when the tube has to be withdrawn.

The inclined plates should be so fitted to the furnace that they can be readily withdrawn, cleansed, and replaced, and in one or both of the side walls of the furnace there must be proper working-holes provided with suitable doors.

It will be observed that the inclined plates are so arranged that the products of combustion must pass both above and below the said plates, and, therefore, that each thin stream of liquid must in its progress be subjected to the heat of the plates below, and above to the direct heat of the products of combustion.

I claim as my invention—

1. The mode herein described of evaporating alkaline solutions—that is to say, causing them to flow down inclined plates in the evaporating-chamber of a furnace, as set forth.

2. The combination of the inclined plates in the furnace with distributing-tubes G, each tube having an elongated opening with notched edges, as specified.

3. The combination of the tank E and furnace with the distributing-tubes G, detachable from the furnace, as and for the purpose described.

In testimony whereof I have signed my name to this specification in the presence of two subscribing witnesses.

WILLIAM G. ENTREKIN.

Witnesses:
HENRY HOWSON, Jr.,
HARRY SMITH.